United States Patent [19]
Korner et al.

[11] 3,882,263
[45] May 6, 1975

[54] ELECTRICAL PENETRATION FOR WITHSTANDING VOLTAGE SURGE ON THE CONDUCTOR

[75] Inventors: Renzo L. Korner, Horseheads; David Green, Corning, both of N.Y.

[73] Assignee: Westinghouse Electric Corporation, Pittsburgh, Pa.

[22] Filed: Apr. 3, 1974

[21] Appl. No.: 457,685

[52] U.S. Cl................... 174/11 R; 174/28; 174/151
[51] Int. Cl....................... G21c 13/02; H01b 17/26
[58] Field of Search........ 174/11 R, 18, 21 R, 21 C, 174/22 R, 22 C, 23 R, 28, 70 S, 151, 152 R

[56] References Cited
UNITED STATES PATENTS

| | | | |
|---|---|---|---|
| 3,781,453 | 12/1973 | Funk et al. | 174/11 R |
| 3,828,118 | 8/1974 | Bushek et al. | 174/11 R |

*Primary Examiner*—Laramie E. Askin
*Attorney, Agent, or Firm*—W. G. Sutcliff

[57] ABSTRACT

An electrical penetration assembly in which a compressive setting resinous potting material substantially fills the penetration assembly tubular enclosure wherein the potting material is spaced apart to form a centrally located leak monitoring chamber. A high dielectric strength fluid fills the leak monitoring chamber so that said assembly can withstand a high voltage surge on the conductor.

4 Claims, 2 Drawing Figures

HIGH DIELECTRIC STRENGTH FLUID, PREFERABLY SF$_6$ GAS

HIGH DIELECTRIC STRENGTH FLUID PREFERABLY SF$_6$ GAS

HIGH DIELECTRIC STRENGTH FLUID; PREFERABLY SF₆ GAS

HIGH DIELECTRIC STRENGTH FLUID PREFERABLY SF₆ GAS

3,882,263

ELECTRICAL PENETRATION FOR WITHSTANDING VOLTAGE SURGE ON THE CONDUCTOR

BACKGROUND OF THE INVENTION

In commercial nuclear power stations in which a nuclear reactor is utilized to produce steam to drive turbines to generate electricity, a safe containment structure is provided about the reactor vessel. The containment structure comprises a structural metal wall and a concrete barrier about the metal wall. The containment structure is meant to withstand hypothetical accident conditions in which radioactive gases are to be prevented from reaching the outside atmosphere. The containment structure completely isolates the reactor environment from the atmosphere. All electrical power cables and instrumentation cables must be sealingly brought through the wall of the containment structure.

An improved modular type electrical penetration assembly is set forth in copending application Ser. No. 432,375, filed Jan. 10, 1974 and, entitled "MODULAR ELECTRICAL PENETRATION," and owned by the assignee of the present invention. In the electrical penetration assembly detailed in the above-identified copending application, a tubular metal enclosure is adapted to be mounted through a connection nozzle to a penetration nozzle for bringing the electrical leads through the containment wall. A pair of axially aligned annular seal shroud means are disposed within the enclosure defined by the tubular metal member with the conductive member passing through annular seal shroud means. A compressive setting, resinous potting material substantially fills the enclosure, and is spaced apart to form a centrally located leak monitoring chamber which is connected through an aperture through the tubular metal enclosure to a leak monitoring system. The leak monitoring chamber will typically be filled with selected gas and is of a relatively small volume in order to insure high sensitivity for the leak detecting system. It is desirable that such an electrical penetration for a containment structure be able to carry a medium voltage of from 5 to 15 KV and have a relatively small overall diameter, which penetration can withstand relatively high voltage surge test conditions.

SUMMARY OF THE INVENTION

An electrical penetration assembly comprising a metal enclosure member which is preferably tubular with a pair of axially aligned annular seal shroud means disposed within the enclosure, one end of which is sealingly connected to the interior surface of the tubular metal enclosure. The other end of the seal shroud means is spaced from the metal member and has an outer surface generally parallel to the surface of the metal member. The electrical conductor extends longitudinally through the tubular metal enclosure member and the annular seal shroud means. A compressive setting resinous potting material substantially fills the enclosure, which potting material is spaced apart to form a centrally located leak monitoring chamber which is connected through an aperture in the metal enclosure member to a leak monitor system. A high dielectric strength fluid such as sulfur-hexafluoride fills the leak monitoring chamber so that the penetration assembly can withstand a high voltage surge on the conductor.

DESCRIPTION OF THE PREFERRED EMBODIMENTS

Figure 1:
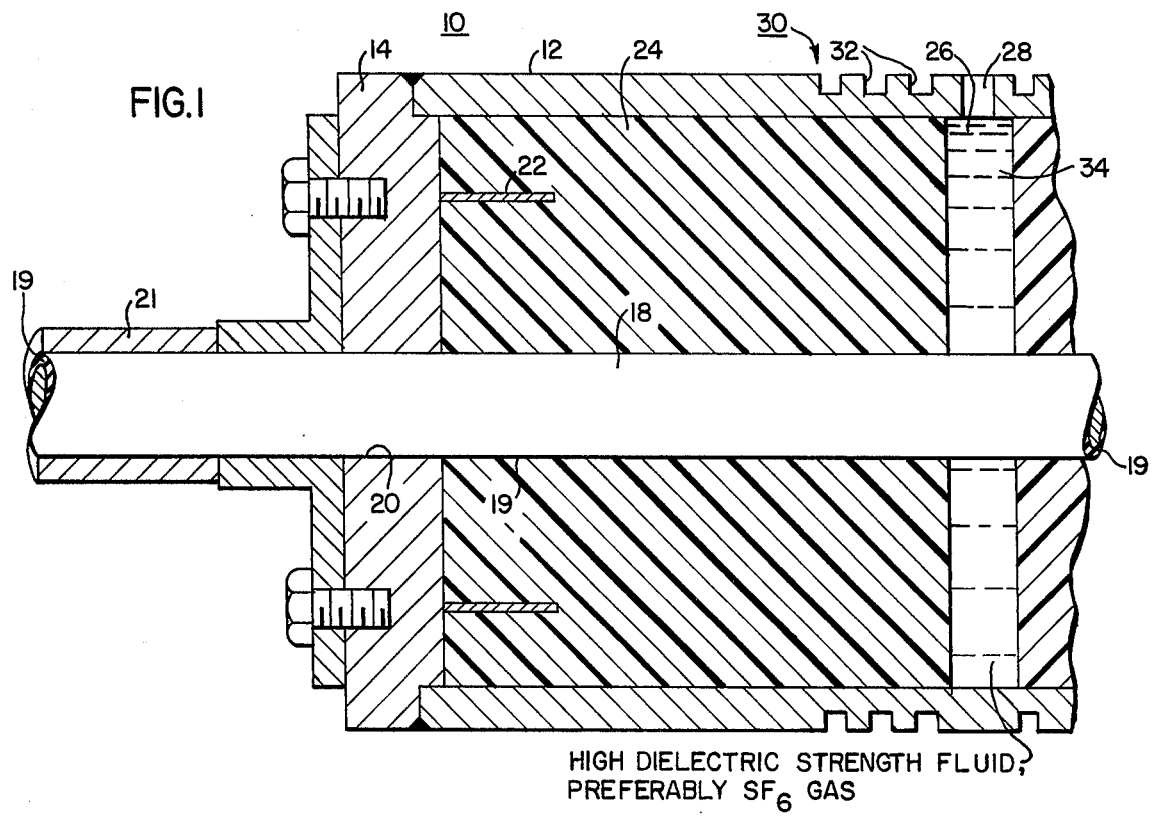
FIG. 1 is a side elevational view partly in section of an electrical penetration embodiment of the present invention.

The present invention can be best understood by reference to the exemplary embodiments seen in the drawings. In FIG. 1 penetration assembly 10 comprises a tubular metal enclosure member 12 having an end bulkhead 14 and an opposite end bulkhead, not shown, welded thereto. Conductor 18 is passed through aperture 20 provided in bulkhead 14. The conductor 18 may be provided with an insulative casing 19 as it is brought through bulkhead 14. The other end bulkhead and conductor passage, not shown, are identical to the end shown. A metal shielding 21 may then be provided about the insulative casing 19 external to the penetration, and the metal shielding 21 connected to the bulkhead exterior.

An annular seal shroud means 22 is provided attached to each end bulkhead. The annular seal shroud means 22 is of a diameter less than the tubular body member 12 but is closely spaced therefrom. The annular seal shroud means 22 is a general cylindrical body, one end of which is sealingly connected to the interior of the bulkhead. The shroud means is disposed concentrically within the tubular enclosure member 12. A compressive setting resinous potting material 24 substantially fills the enclosure defined by the tubular metal member and the end bulkhead, but a centrally located leak monitoring chamber 26 is provided by spacing the resinous material in the central portion of the enclosure. An aperture 28 through the tubular metal member 12 connects the leak chamber 26 to a leak monitoring system which is not shown. Circumferential sealing means 30 are provided on the exterior surface of the tubular metal member on either side of the internally located leak monitoring chamber 26. The sealing means 30 comprises a pair of 0-ring grooves 32, on each side of the central chamber 26. The grooves 32 receive silicone 0-rings, which are not shown, and which form a seal between the penetration assembly and a receiving flange or socket. A high dielectric strength fluid 34 fills the leak monitoring chamber 26, which fluid is preferably sulfur-hexafluoride. The sulfur-hexafluoride fluid permits the penetration assembly to withstand high voltage test and operating surges which might otherwise result in a short circuit between the conductor and the tubular metal enclosure member. The sulfur-hexafluoride gas is typically maintained at a pressure of several atmospheres. Thus, for a 5 inch diameter tubular metal member and a one inch diameter conductor the penetration can withstand a test surge of up to about 125 KV. The fluid dielectric can also be high dielectric strength oil such as is used in transformers. The fluid dielectric should be sufficient to provide a dielectric strength of at least several hundred volts per mil.

The compressive setting resinous material forms a very good radiation resistant seal along the length of the conductor 18, as well as forming a very good compressive seal on the exterior surface of the seal shroud means 22. In order to improve the capacity of the structure to tolerate high temperature during a momentary short circuit condition, it may be desirable to substitute a multiplicity of conductor rods for the single conductor as shown in FIG. 1. The resinous potting material would thus make a seal about each of the individual lesser diameter rods which are the current carrying conductors.

Figure 2:
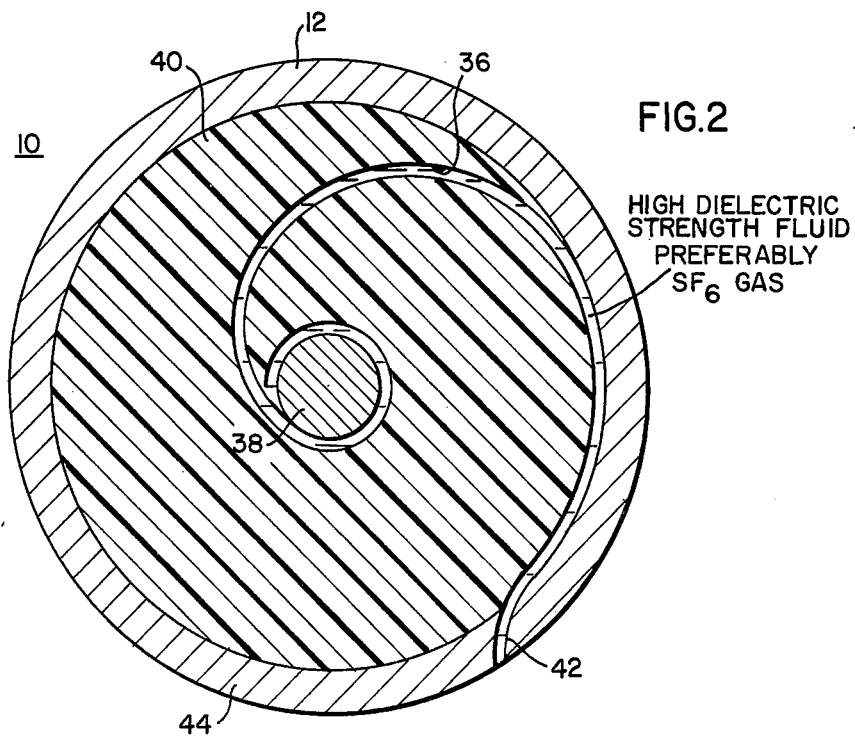
FIG. 2 is a sectional view through a spiral leak detecting or leak monitoring chamber which is taken along the longitudinal axis of a generally tubular penetration assembly embodiment.

In another embodiment of the invention as seen in FIG. 2, a spiral leak monitoring chamber 36 extends from about the conductor 38 through the resinous potting material 40 and aperture 42 provided through tubular metal member 44. The spiral leak monitoring chamber may be readily provided by utilizing a deformable meltable rod exterior from about the conductor and spirally winding it outwardly and passing it through the aperture 42 in the metal member prior to the filling of the enclosure with the resinous potting material 40. After the resinous potting material has set in place, the rod, which may be formed of a metal for example such as indium, may be melted out to provide the spiral leak chamber 36.

The spiral leak chamber 36 can then be filled with the high dielectric strength fluid. The spiral path greatly extends the voltage breakdown path from just the radial distance from the conductor to the metal enclosure member.

The resinous potting material itself is an insulating material and can withstand the high voltage surges.

In the embodiments shown a single conductor was illustrated, but multiple electrically parallel conductors may be substituted for certain applications. Such multiple conductors provide a greater heat radiating capacity to avoid thermal breakdown.

In fabricating the penetration, depicted in FIG. 1, the bulkheads are affixed in place at each end of the tubular enclosure members, and the resinous potting material is poured first into one end from the center through the aperture 28 in the enclosure. The material compressively sets in place, and then the penetrator is inverted and the potting material poured into the other end to complete the fabrication. As the potting material sets it forms a very effective compressive seal about the conductor and about the exterior surface of the seal shroud means.

We claim:

1. In an electrical penetration assembly comprising a metal enclosure member, a pair of axially aligned annular seal shroud means disposed within the enclosure defined by the metal member, each of said annular seal shroud means including a sealing end which is sealingly connected to the interior surface of the metal member, and a free end which is spaced from the metal member, which free end has another surface generally parallel to the interior surface of the metal member, at least one longitudinally extending electrical conductor extending through the enclosure and passing through the annular seal shroud means, a compressive setting resinous potting material substantially filling the enclosure which potting material has spaced apart portions forming a centrally located leak monitoring chamber, and an aperture is provided through said metal enclosure member interconnected with the leak monitoring chamber, the improvement wherein a fluid having a dielectric strength substantially greater than air fills the leak monitoring chamber so that said assembly can withstand a high voltage surge on the conductor.

2. The electrical penetration assembly specified in claim 1, wherein the leak monitoring chamber is a spiral chamber extending from a centralized conductor outward to said metal enclosure member whereby the voltage breakdown path between the central conductor and the metal enclosure member is made greater than the radial distance between the central conductor and the metal enclosure member.

3. The electrical penetration assembly specified in claim 1, wherein the fluid dielectric is sulfurhexafluoride.

4. In an electrical penetration assembly comprising a metal enclosure member, a pair of axially aligned annular seal shroud means disposed within the enclosure defined by the metal member, each of said annular seal shroud means including a sealing end which is sealingly connected to the interior surface of the metal member, and a free end which is spaced from the metal member, which free end has another surface generally parallel to the interior surface of the metal member, a centrally disposed longitudinally extending electrical conductor extending through the enclosure and passing through the annular seal shroud means, a compressive setting resinous potting material substantially filling the enclosure which potting material has spaced apart portions forming a centrally located leak monitoring chamber, and an aperture is provided through said metal enclosure member interconnected with the leak monitoring chamber which comprises a spiral chamber extending from the centralized conductor outward to said metal enclosure member whereby the voltage breakdown path is made greater than the radial distance between the conductor and the metal enclosure member, and, wherein a high dielectric strength fluid fills the spiral chamber so that said assembly can withstand a high voltage surge on the conductor.

* * * * *